(No Model.)

E. W. OTIS.
SKATE ROLLER.

No. 315,823. Patented Apr. 14, 1885.

WITNESSES:
Chas. S. Gooding.
E. A. Phelps.

INVENTOR:
Elisha W. Otis
by A. N. Spencer
Attorney

UNITED STATES PATENT OFFICE.

ELISHA W. OTIS, OF CHELSEA, ASSIGNOR TO WM. G. BELL, OF BOSTON, MASSACHUSETTS.

SKATE-ROLLER.

SPECIFICATION forming part of Letters Patent No. 315,823, dated April 14, 1885.

Application filed January 26, 1885. (No model.)

*To all whom it may concern:*

Be it known that I, ELISHA W. OTIS, a citizen of the United States, residing at Chelsea, in the county of Suffolk and State of Massachusetts, have invented certain new and useful Improvements in Skate-Rollers; and I do hereby declare that the same are fully described in the following specification and illustrated in the accompanying drawings.

The object of this invention is to insure greater freedom of rotation in wheels or rollers, especially in such as are designed for roller-skates, since the value of such skates is vastly enhanced by a material lessening of the friction of the rollers on their journals, whereby greater speed and ease of movement are attained.

My invention is embodied in a skate-roller having an axial metallic bushing secured within it to receive the cylindrical spindle, and a series of parallel cylindrical rollers filling the annular space between the bushing and spindle, such rollers being kept from longitudinal displacement at one end by a shoulder on the spindle or the bushing, and at the other end by a washer and pin or equivalent means. A loose sleeve may be interposed between the rollers and the bushing.

Figure 1:
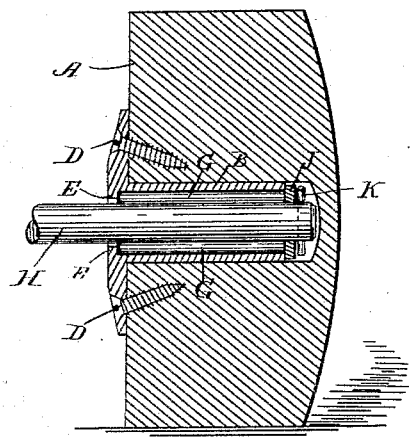
Figure 2:
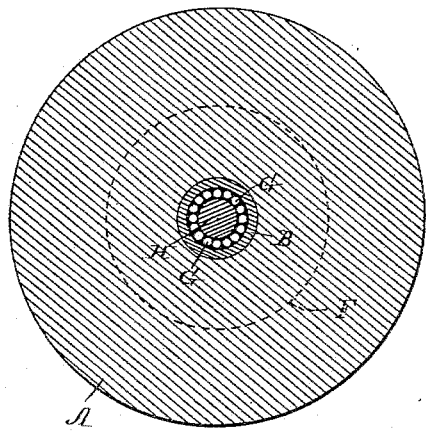
Figure 3:
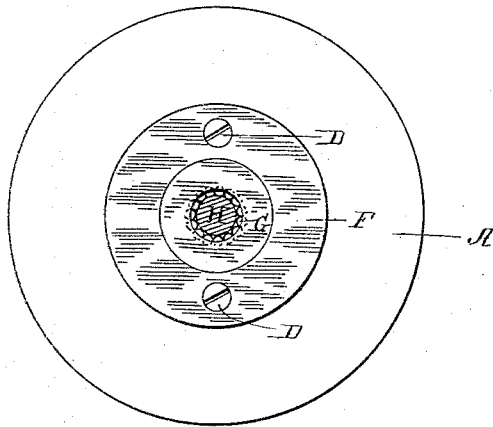
Figure 4:
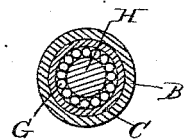

In the drawings, Figure 1 represents my improved wheel in axial section. Fig. 2 is a transverse section thereof. Fig. 3 is an inner face view of the wheel; and Fig. 4, an enlarged transverse section of the rolling bearing, with a cylindrical sleeve between the rollers and bushing.

A is the wheel, preferably of boxwood; and B, the bushing secured axially therein. The means shown for securing the bushing consist in forming it with a broad radial flange, F, through which two or more screws, D, are inserted into the inner face of the wheel. The cavity within the bushing is of cylindrical form, with its wall smooth and hard.

G G represent a series of anti-friction steel rollers arranged side by side in the annular space between the spindle H and the inner walls of the bushing. A shoulder, E, on the flange F of the bushing keeps the rollers G from slipping in that direction, (see Fig. 1;) or the spindle may be enlarged by a shoulder at that point, or a ring slipped on between the wheel and the bracket or hanger of the skate for the same purpose. The rollers G are kept from moving in the opposite direction by a washer, J, covering the end of the bushing, and held in position by a pin, K, through the spindle. The skate-hanger, through which the spindle passes, keeps the wheels from moving toward each other. By preference I leave the hub of the wheel A solid, or of the natural wood, as in Fig. 1, so that the end of the spindle is concealed. In such case the parts are assembled before the bushing is inserted in the wheel, the bushing being slipped on over the spindle, the steel rollers introduced at the end opposite the flange F, the washer applied, and secured to the spindle by the pin K. The bushing is then forced into the wheel, and the flange F fastened to its inner face. When the bushing is of soft metal, I interpose a cylindrical steel sleeve between the bushing and the rollers G, as at C in Fig. 4. This sleeve fits loosely enough within the bushing to revolve therein, and it preserves it from being unduly worn by the rollers. I thus provide a skate-roller which revolves with great freedom with little or no lubrication, and is therefore especially desirable.

I am aware that rolling bearings in some forms have heretofore been used in pulley-blocks, and for other purposes not analogous to mine, nor constructed as herein described and shown; hence, while I do not claim rolling bearings, broadly,

I claim as my invention—

1. The wheel A, having firmly secured within it the bushing B, in combination with the spindle H, provided with the washer J and pin K, or equivalent devices, and the series of rollers G, arranged substantially as set forth.

2. The wheel A, formed with a solid outer face of the natural wood, and provided with the flanged axial bushing, as described, in combination with the series of anti-friction rollers G, arranged between the spindle and bushing, and with a washer or collar secured on said spindle, and covering the outer end of said rollers and bushing, substantially as set forth.

3. The combination of wheel A, bushing B, sleeve C, rollers G, and spindle H, arranged substantially as set forth.

In testimony whereof I hereto affix my signature in presence of two witnesses.

ELISHA W. OTIS.

Witnesses:
A. H. SPENCER,
E. A. PHELPS.